US011316628B2

(12) United States Patent
Files et al.

(10) Patent No.: US 11,316,628 B2
(45) Date of Patent: Apr. 26, 2022

(54) INFORMATION HANDLING SYSTEM MULTI-STREAM CABLE THROUGHPUT MANAGEMENT

(71) Applicant: Dell Products L.P., Round Rock, TX (US)

(72) Inventors: Jace W. Files, Round Rock, TX (US); Karthikeyan Krishnakumar, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 177 days.

(21) Appl. No.: 16/670,524

(22) Filed: Oct. 31, 2019

(65) Prior Publication Data

US 2021/0135790 A1      May 6, 2021

(51) Int. Cl.
*H04N 19/146* (2014.01)
*H04L 1/18* (2006.01)
*H04N 19/166* (2014.01)

(52) U.S. Cl.
CPC ........... *H04L 1/189* (2013.01); *H04N 19/146* (2014.11); *H04N 19/166* (2014.11)

(58) Field of Classification Search
CPC ..... H04L 1/189; H04N 19/146; H04N 19/166
See application file for complete search history.

(56) References Cited

U.S. PATENT DOCUMENTS

| 9,426,085 | B1 | 8/2016 | Anand |
| 9,742,689 | B1 | 8/2017 | Wang |
| 10,349,465 | B2 | 7/2019 | Kyles |
| 2018/0157300 | A1* | 6/2018 | Kamepalli ............. G06F 13/24 |
| 2019/0150021 | A1* | 5/2019 | Sugaya .................. H04L 1/165 370/230 |
| 2020/0100269 | A1* | 3/2020 | Gulbay ............... H04W 72/048 |
| 2020/0184921 | A1* | 6/2020 | Yong ....................... G06F 1/266 |

FOREIGN PATENT DOCUMENTS

| DE | 112016002895 | T5 | 3/2018 |
| JP | 5867765 | B2 | 3/2015 |

* cited by examiner

*Primary Examiner* — Shawn S An
(74) *Attorney, Agent, or Firm* — Zagorin Cave LLP; Robert W. Holland (57) ABSTRACT

An information handling system communicates with external devices, such as a docking station, through a multi-protocol streaming cable, such as USB 3.0 (or greater) cable having a USB data protocol, a DisplayPort graphics protocol and a power transfer protocol. Upon detection of excessive errors at the cable, the multi-protocol stream is adjusted to maintain errors within an acceptable range and prioritize information transferred through one of the protocols. Adjustments may include changes to the number of data lanes assigned to each protocol, changes to the rate at which information is transferred with each protocol and changes to power transfer.

9 Claims, 6 Drawing Sheets

INFORMATION HANDLING SYSTEM MULTI-STREAM CABLE THROUGHPUT MANAGEMENT

BACKGROUND OF THE INVENTION

Field of the Invention

The present invention relates in general to the field of portable information handling system cable communications, and more particularly to an information handling system multi-stream cable throughput management.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Generally portable information handling systems include one or more ports that support communication with external power and peripheral devices, such as a keyboard, mouse, network interface, docking station interface and display. Conventional portable information handling systems tended to include multiple ports of multiple types to support different types of interfaces. For example, a DisplayPort or HDMI port couples to a display cable to communicate pixel values to a display for presentation of visual images; a power port couples to a power port compatible by its configuration with an external AC/DC power source that provides DC power to run the processing components and charge an internal battery; an Ethernet port couples to a CAT V cable to interface with a local area network (LAN); and a Universal Serial Bus (USB) cable couples to peripheral devices for transfer of information and, in some instances power.

With improvements in processing component power and thermal characteristics, portable information handling systems have trended towards thinner or low Z-height housings. End user's tend to prefer thinner and lighter weight portable systems that are less bulky when stored. One problem that arises with such thinner systems is that the housing tends to have less space and structural robustness for including external cable ports. To address this difficulty, low profile systems have adopted USB 3.0 and later interfaces that include multiple protocols in a single port and cable. For instance, USB 3.1 interfaces can provide simultaneous USB data protocol transfers, DisplayPort graphic protocol transfers and bi-directional power transfers. To provide flexibility to adapt to different data transfer demands, the USB and DisplayPort protocols allocate two data lanes between each other, such as by switching between two or four data lane DisplayPort configurations depending upon the bandwidth needed for display data transfer. Each data lane is a twisted pair differential serial interface that sends data signals with opposing polarity so that the difference between the signals on a twisted pair provides the data values. When a USB 3.0 or later interface switches data lanes between USB data and DisplayPort data, the signals transferred through each differential signal pair changes protocol.

One difficulty that arises with a multi-protocol interface is maintaining information transfer as conditions change at the cable and port. Differential signal pair communications appear on a scope as an 'eye" pattern that has an opening formed by the out of phase signals. As signal strength deteriorates, the eye collapses making the distinction between data values more difficult to identify. Signal strength can vary substantially based upon the length and quality of the cable used for communication and noise conditions at the environment. Generally, to adapt to different conditions, a calibration is performed during communication link training that defines a communication link quality and related link speed for reliable signal transfer. Reduced signal strength is typically managed by reducing signal transfer speeds so that fewer errors occur. In addition, error correction checksums used in the USB and DisplayPort protocols allow error correction, such as for a bit of data with each packet transferred. However, in a multi-protocol cable different types of data are simultaneously transferred along with power so that a dynamic noise environment can disrupt signal communication in excess of available error correction resulting in repeated retransmission of data. This dynamic noise situation can result in unpredictable disruptions of data communication that impact system performance and the end user experience. For example, when errors become excessive on a link with repeated retransmissions, the link fails and re-initializes. These types of failures may cycle repeatedly as noise and data transfer rates on different protocols change over time.

SUMMARY OF THE INVENTION

Therefore, a need has arisen for a system and method which provides information handling system multi-stream cable throughput management.

In accordance with the present invention, a system and method are provided which substantially reduce the disadvantages and problems associated with previous methods and systems for managing cable communications at an information handling system. Communication parameters of a multi-protocol stream passing through a common cable are adjusted in response to a predetermined number of errors to manage a consistent cable interface and prioritize information for communication across the cable. In a USB cable and interface, data and graphic lane assignments and power transfer are adjusted to provide communication transfer rates that meet link reliability and information transfer constraints.

More specifically, an information handling system processes information with processing components disposed in a housing, such as a central processing unit (CPU) that executes instructions stored in memory to process information for presentation as visual images at a display. The information handling system interfaces with external devices, such as a docking station or peripheral display, through a multi-stream cable, such as USB 3.0 or greater cable that supports a USB data protocol, a DisplayPort graphics protocol and USB power transfer protocol. A communications manager disposed in the information handling system monitors errors reported by each protocol to determine if an error threshold is met, such as by counting link resets, USB bit error corrections and DisplayPort forward error corrections. When an error threshold is met, the communications manager determines a communication protocol having a priority and adjusts communication parameters to achieve the priority without communication link resets that can disrupt the end user experience. For example, the number of data lanes assigned to the data and graphics protocols are adjusted so that a data transfer rate with reliable error control is available for the priority protocol and data transfer on other protocols is throttled as needed. As another example, power transfer may adjust voltage or current to achieve a noise profile having less impact on the prioritized protocol.

The present invention provides a number of important technical advantages. One example of an important technical advantage is that an information handling system adopts to a dynamic multi-stream communication environment having asynchronous data communication by adjusting data transfer and power transfer from a system level to achieve system operational objectives. If errors at a multi-stream communication cable exceed a threshold, communication rates are adjusted at a system level to manage data throughput on a use case that emphasizes system level priorities. For instance, a decrease in display data transfer may be appropriate where applications presented by the display have a limited color palette. As another example, reducing power transfer may be appropriate where power consumption is limited and/or battery charge state is high. USB data transfers may be adjusted to lower rates where the amount of data transferred will fit through a decreased bandwidth or by transitioning display lanes to USB transfer. Reducing link resets improves system performance and the end user experience.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system manages communication through a multi-stream cable by adapting protocol parameters and data transfer rates to reduce link resets that disrupt system operations. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
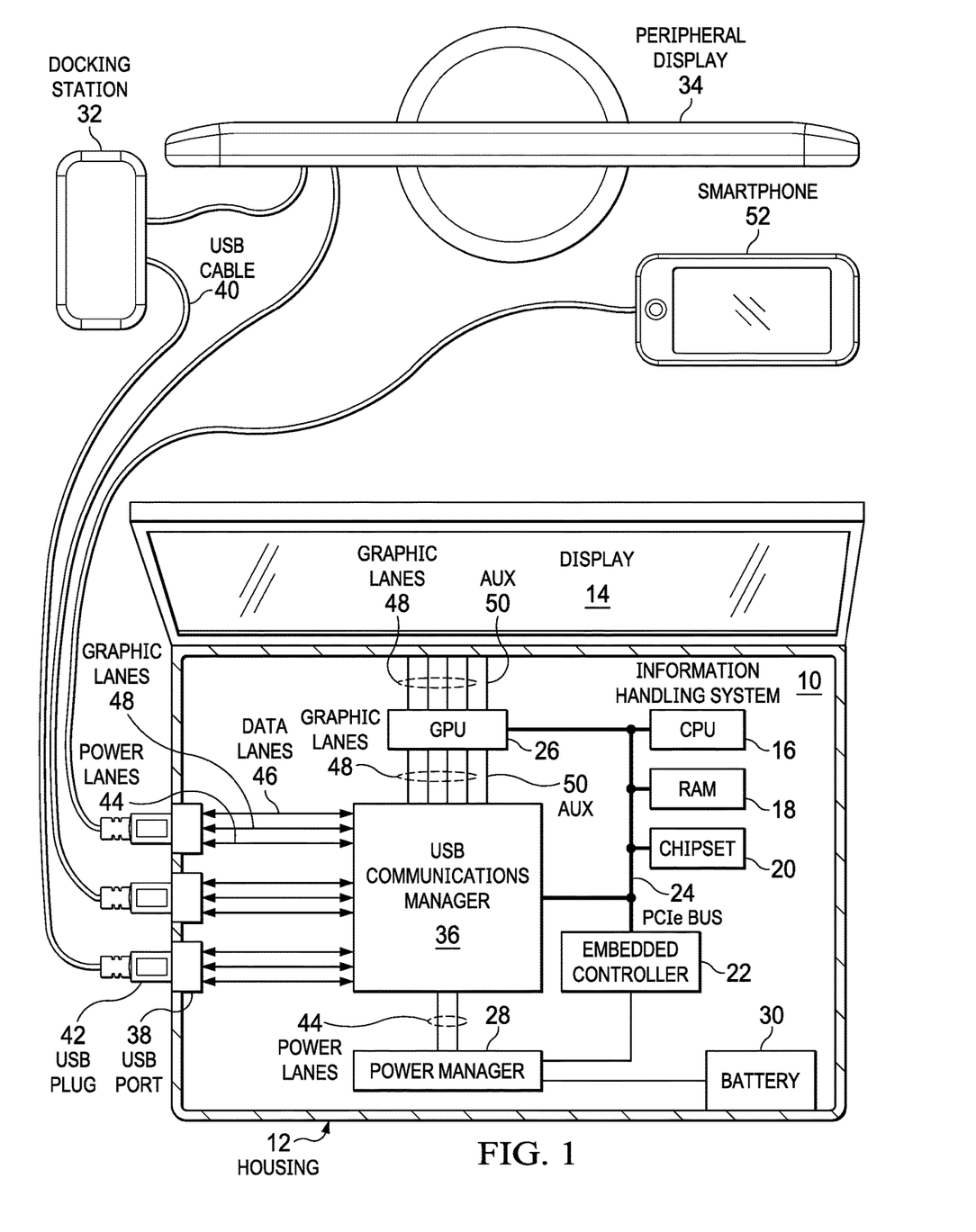
FIG. 1 depicts a block diagram of an information handling system interfacing with external devices through a multi-stream protocol cable that adapts communication protocols to achieve information transfer constraints.

Referring now to FIG. 1, a block diagram depicts an information handling system 10 interfacing with external devices through a multi-stream protocol cable 40 that adapts communication protocols to achieve information transfer constraints. In the example embodiment, information handling system 10 processes information in a portable housing 12 having an integrated display 14 to present the information as visual images. In alternative embodiments, housing 12 may have a desktop, all-in-one or other type of configuration. A central processing unit 16 executes instructions, such as an operating system and application, to process information in cooperation with a memory 18, such as a random access memory (RAM), that stores the instructions and information. A chipset 20 manages CPU 16 operations, such as clock speed and memory accesses through a PCIe bus 24 or other internal communication bus. An embedded controller 22 manages hardware and embedded code cooperation, such as to provide power and thermal management for the processing components. For instance, embedded controller 22 interfaces with a power manager 28, such as a charger integrated circuit, to coordinate power supply from an external power source or a battery 30 and to manage charging of battery 30. A graphics processor unit (GPU) 26 interfaces with CPU 16 to process information for presentation at display 14. For example, GPU 26 processes information to generate pixel values that define visual images for presentation at pixels of display 14.

In the example embodiment, information handling system 10 interfaces with three external devices through a multi-stream Type C USB cable 40: a docking station 32, a peripheral display 34, and a smartphone 52. Each cable 40 terminates in a Type C USB plug that couples to a Type C USB port 38. Within information handling system 10, communication with one or plural USB ports 38 is managed by a communications manager, such as USB hub having a Type C Port Manager (TCPM). Each USB port 38 supports an interface with wirelines of USB cable 40 through USB plug 42. USB 3.0 and later standards define twisted pair differential signal data lanes that configure between communication of USB data or display data depending upon bandwidth needs of information handling system 10. In addition, USB 3.0 and later cables 40 and ports 38 support bi-directional power transfer through the Power Deliver (PD) standard. The example embodiment depicts communication manager 36 interfaced through power lanes 44 with power manager 28 to supply power that runs the processing components and charges battery 30, such as with power communicated at 5, 9, 15 and 20V for up to 100 W of power. USB communications manager 36 provides communication of graphics information, such as pixel values to scan to peripheral display 34, through graphics lanes 48. For instance, graphics lanes 48 include four unidirectional graphics data lanes that carry DisplayPort packets and one bi-directional auxiliary lane 50 that carries DisplayPort control signals. Data lanes 46 carry bi-directional data with USB protocol packets.

Communications manager 36 adjusts protocol parameters for the data, graphics and power lanes to maintain desired communication constraints. In the example embodiment, information handling system 10 interfaces with docking station 32 through a cable 40 to support data information, graphics information and power transfer. For instance, graphics information passes through graphics lanes 48 of cable 40 and to docking station 32 to support presentation of visual images at peripheral display 34 that separately couples to docking station 32. Simultaneously, docking station 32 may provide USB data transfer through cable 40, such as to support a network interface, and power transfer. In alternative embodiments, a direct cable interface between information handling system 10 and peripheral display 34 may support graphics information transfer to present visual images at peripheral display 34 and bi-direction power transfer. Smart phone 52 interfaces with information handling system 10 to support USB data transfer, such as to synchronize photos, and bi-directional power transfer, such as to charge the battery of smart phone 52. In each case, USB standard link training is performed at link initialization, however, information and power transfer may take place in a highly varied and asynchronous manner at each of the separate data and power lanes. As a result, crosstalk across the data and power lanes can exceed expected noise conditions determined at initialization, resulting in errors and link failure. The USB protocol provides correction of one-bit errors through a self-correcting checksum. The DisplayPort protocol correction with the Reed Solomen Forward Error Correction (FEC) method for blocks of graphics information. If the number of errors exceeds the capability for self-correction, the associated information is either retransmitted or dropped. If an excessive number of errors occurs, the link typically fails to force a re-initialization; however, initialization may not correctly adapt the graphic, data and power protocol parameters to improve link reliability where asynchronous transfers will continue to vary crosstalk conditions at the USB cable.

To improve link reliability across USB cable 40, communications manager 36 monitors errors associated with the link and adjusts protocol parameters to improve link reliability and avoid link resets. In one example embodiment, communications manager 36 monitors error corrections performed on transferred information as an indication of the quality of the link. As another example, communications manager 36 monitors lost information, such as retransmissions of packets or dropped packets. If a threshold number of errors are detected, communications manager 36 adjusts protocol parameters that define the transfer of data information, graphics information and power with a goal of achieving prioritized communications based upon operating conditions at information handling system 10. For instance, an end user executing a spreadsheet and downloading a large file might have USB data information prioritized while reducing the colors used by the spreadsheet so that graphics information is decreased. In such a scenario, communications manager 36 may command a reduction in graphic colors, a reduction in graphics information transfer rate and an increase in USB data transfer rates. As an alternative, communications manager 36 can adjust the data lane distribution so that data lanes assigned to graphics information transfer are instead assigned to USB data information transfer. For instance, DisplayPort provides for transfer of graphics information as packets across two unidirectional data lanes or four unidirectional data lanes as coordinated through a bidirectional auxiliary lane. Communication manager 36 commands a transition from four to two graphic data lanes and then assigns the two free data lanes as USB data lanes to increase the bandwidth available for transfer of data information. In a situation where additional graphics information bandwidth is needed, communications manager 36 may take two data lanes from the USB data protocol and assign the freed two data lanes to the DisplayPort protocol. In addition to reallocation of the number of data lanes between the data and graphics protocols, communication manager 36 adjusts information transfer rates for each protocol to achieve a more robust link. In some instances, the information transfer rate may increase with the assignment of additional data lanes, in other instances the information transfer rate may instead decrease. In addition, communications manager 36 may change the power transfer rates so that coupled noised associated with power supply is reduced or changes its interference characteristics.

Communications manager 36 adjusts data, graphics and power protocol configurations to achieve a desired communication goal and to maintain constraints for lower priority protocols. For example, communications manager 36 analyzes operating conditions to determine a list of priorities at the information handling system. The priority may be based upon which of the protocols has the heaviest information transfer rate or may be based upon the applications open and active at the information handling system. With respect to power transfer, a priority for power transfer versus information transfer may be determined based upon system power demand, battery charge and power applied by the system to external devices, such as for charging a smart phone. Once the transfer of the greatest priority is determined, a protocol configuration is set for that transfer that achieves a desired goal, such as the maximum transfer rate over a recent historical period. For instance, the priority protocol is provided with enough data lanes and a high enough data transfer rate to achieve full communication of demanded information. Once the priority communication protocol configuration of parameters is established, the other communication protocol parameters are configured to help maintain a robust link. For instance, if graphics information is a priority, USB data is throttled and power is reduced to help ensure a robust link that does not reset under asynchronous information and power transfers. As an example, the table below depicts a default priority, a spreadsheet application priority and a gaming application priority. In the default user priority, the highest display resolution is provided with a lower priority for USB data protocol throughput. With the spreadsheet application, such as EXCEL, color depth has a reduced importance since the application has small color palette while USB data protocol transfer have an increased importance where information may be stored at an external storage device accessed by USB data communications. In the gaming application, framerate and resolution are maximized to provide full graphics while USB data and power transfers have reduced importance.

| Priority Based Use Case Table | | | |
|---|---|---|---|
| | Default User Priority | Application Priority (MS Excel) | Application Priority (Gaming) |
| USB Throughput | 6 | 1 | 6 |
| Color Depth | 4 | 5 | 3 |
| Framerate | 3 | 4 | 1 |
| Resolution | 2 | 2 | 2 |
| Compression | 5 | 3 | 4 |
| USB-PD Power Draw | 1 | 6 | 5 |

One consideration for communications manager 36 in establishing protocol priorities is to compare the relative crosstalk interference across protocols for different protocol configurations. For example, at different transfer rates with different clock speeds different levels of crosstalk interference may arise where overlapping signals resonate to cancel or amplify each other. Thus, in some instances, communications manager 36 may assign lanes between USB data and DisplayPort protocols in a manner that adjusts information transfer rates to reduce crosstalk interference. Generally, lower information transfer rates will provide a more robust link in the face of crosstalk so that assigning additional lanes to a protocol improves bandwidth for the protocol while reducing the transfer rate or clock speed used for the protocol. Power transfer also implicates different types of crosstalk interference that can couple through the USB cable. For instance, communications manager 36 can command power transfer at 5, 9, 15 and 20V of direct current with varied current amounts. By selecting a voltage and current level that reduces crosstalk, communications manager 36 can improve information transfer speeds on the data graphics protocols. For instance, in some situations power transfer may be performed at higher voltage levels and reduced currents to change the resonance relationship of crosstalk interference at the USB cable.

Figure 2:
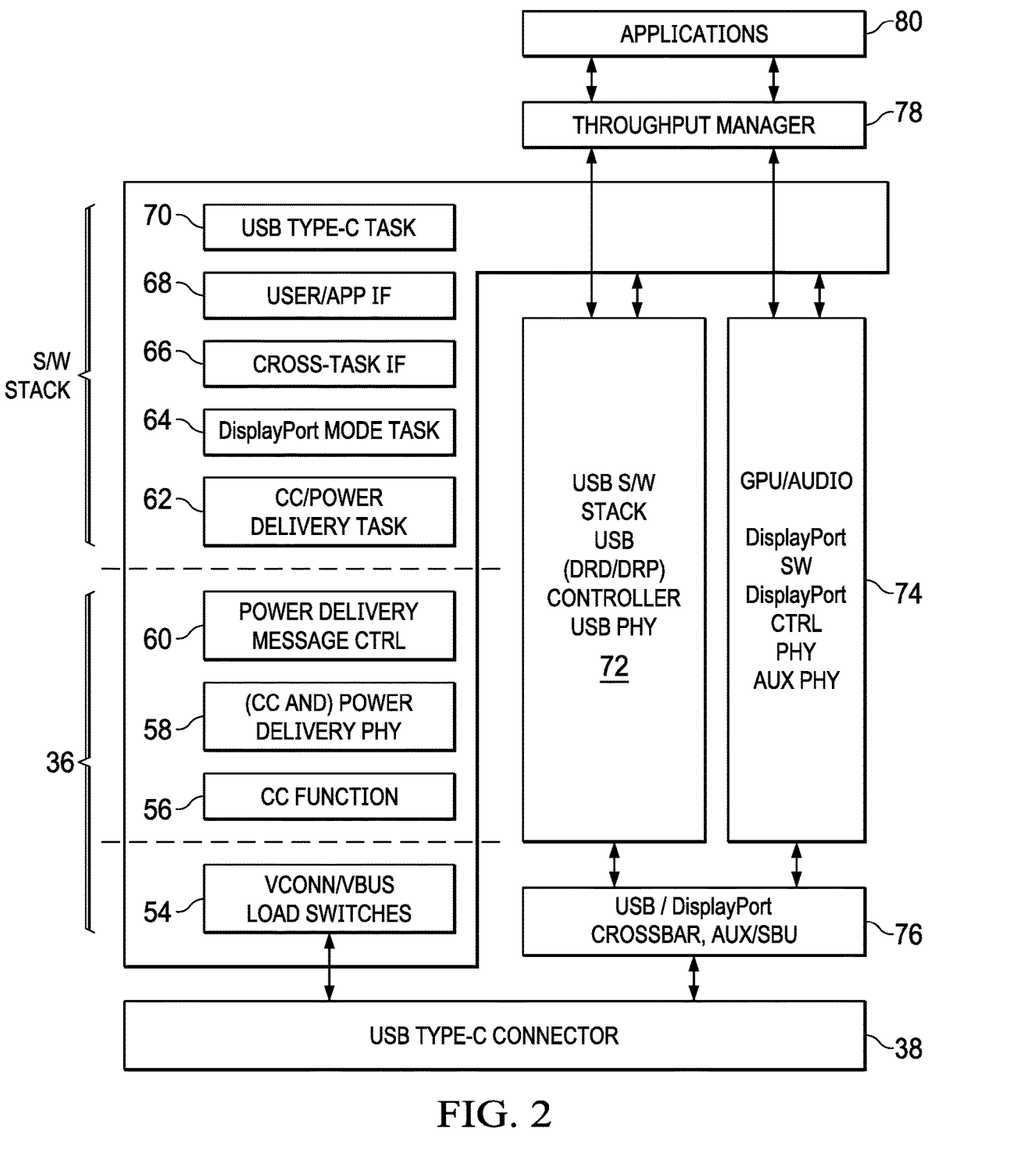
FIG. 2 depicts an example embodiment of a USB Type C software stack supporting cooperation between different protocol streams with a throughput manager.

Referring now to FIG. 2, an example embodiment depicts a USB Type C software stack supporting cooperation between different protocol streams with a throughput manager 78. The example embodiment depicts a Type C Port Manager (TCPM) communications manager 36 that layers software over hardware to provide control of USB data, DisplayPort graphics and USB Power Delivery transfers. A USB type C connector port 38 interfaces with a USB/DisplayPort crossbar switch 76 that accepts USB data information from a USB software stack and controller 72 and DisplayPort graphics information from graphics and audio GPU interface and software stack 74. Connector port 38 also interfaces with power delivery hardware including voltage loading switches 54, a CC function circuit 56 that coordinates USB PD power transfer, a PD PHY 58 and a power delivery message controller 60 that executes the PD software stack. The PD software stack includes a CC power delivery task 62, a DisplayPort mode task 64, a cross task interface 66, and a user application interface 68 that coordinate information and power transfers under a USB Type C task 70 as defined by the USB standard. Throughput manager 78 provides an interface for other applications 80 to adjust data, graphic and power protocols for particular use cases. In the example embodiment, throughput manager 78 falls in an application layer above the TPCM, however, in alternative embodiments, throughput manager 78 may be implemented in full or in part as embedded code within the TPCM stack.

Figure 3:
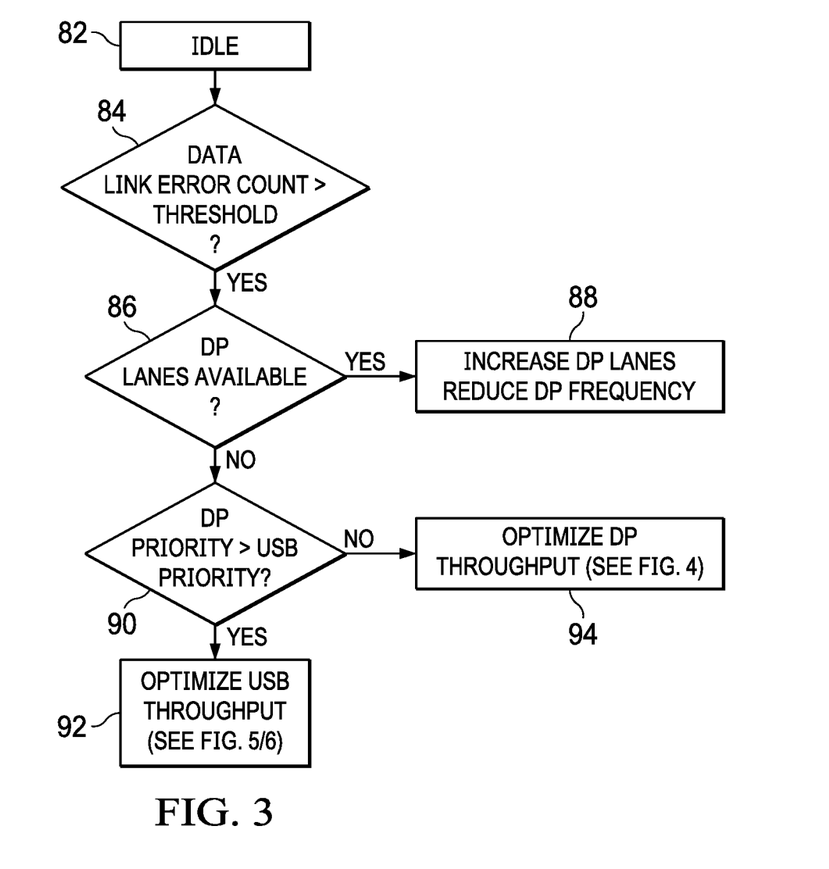
FIG. 3 depicts a flow diagram of a process for prioritizing protocols for communication through a multi-stream cable.
Figure 5:
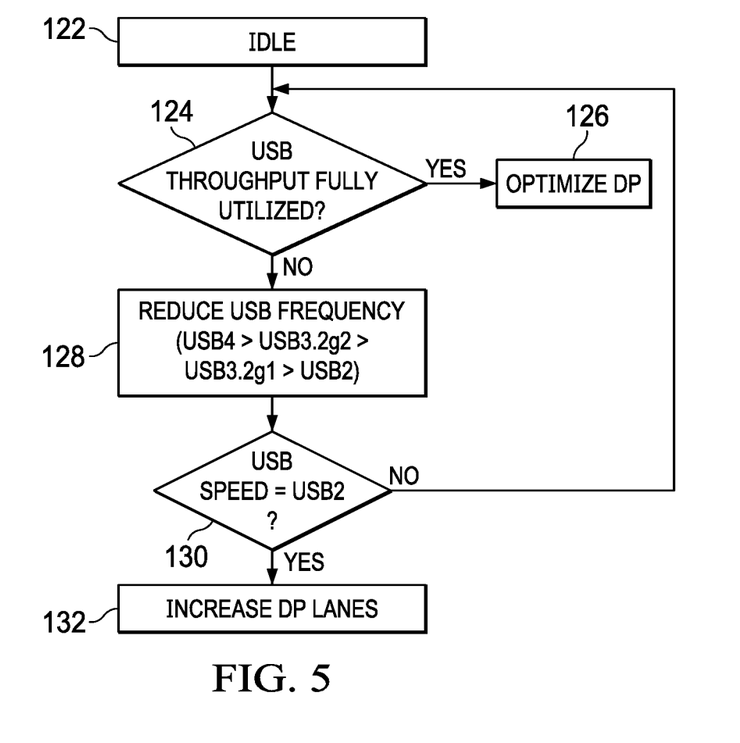
FIG. 5 depicts a flow diagram of a process for adjusting multi-stream communication where a USB data protocol has priority.
Figure 6:
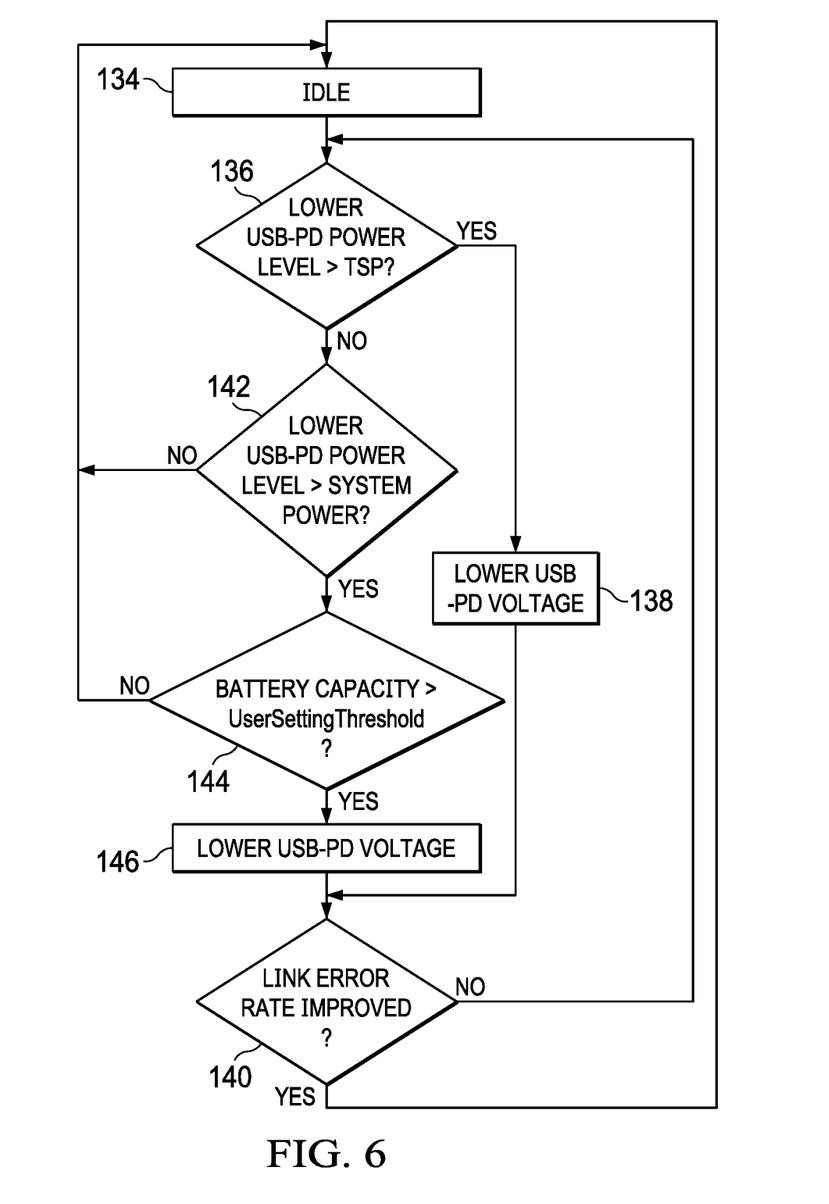
FIG. 6 depicts a flow diagram of a process for adjusting multi-stream communications and power delivery to achieve information transfer constraints.

Referring now to FIG. 3, a flow diagram depicts a process for prioritizing protocols for communication through a multi-stream cable. The process starts at step 82 and continues to step 84 to determine if a communication link error count exceeds a threshold associated with performing a reconfiguration of data, graphics and power protocols. The error count may include error corrections performed on one or both of the data and graphics information, retransmissions performed to include dropped information, and/or combinations of both types of errors on one or both protocols. In one embodiment, the error count is performed over defined time periods, such as every second. Once an error count threshold is exceeded, the process continues to step 86 to determine if DisplayPort lanes are available, such as where all four DisplayPort lanes are assigned with only two lanes communicating information. If DisplayPort lanes are available, the process continues to step 88 to increase the number of DisplayPort lanes assigned to communicate graphics information and reduce the DisplayPort communication frequency so that the lower clock speed provides a more robust interface. In one embodiment, part of the determination to proceed to step 88 is based upon an error count with a greater amount of errors associated with graphics information. Even where a greater number of errors occur with USB data information transfers, reducing the frequency of DisplayPort graphics information transfer reduces crosstalk interference to improve USB data transfer robustness. If at step 86 no DisplayPort lanes are available, the process continues to step 90 to determine whether USB data or DisplayPort graphics information transfer has a higher priority. If USB data transfer has a higher priority, the process continues to step 92 to optimize USB throughput as depicted at FIGS. 5 and 6. If DisplayPort graphics information transfer has priority, the process continues to step 94 to optimize throughput on the DisplayPort lanes as shown in FIG. 4.

Figure 4:
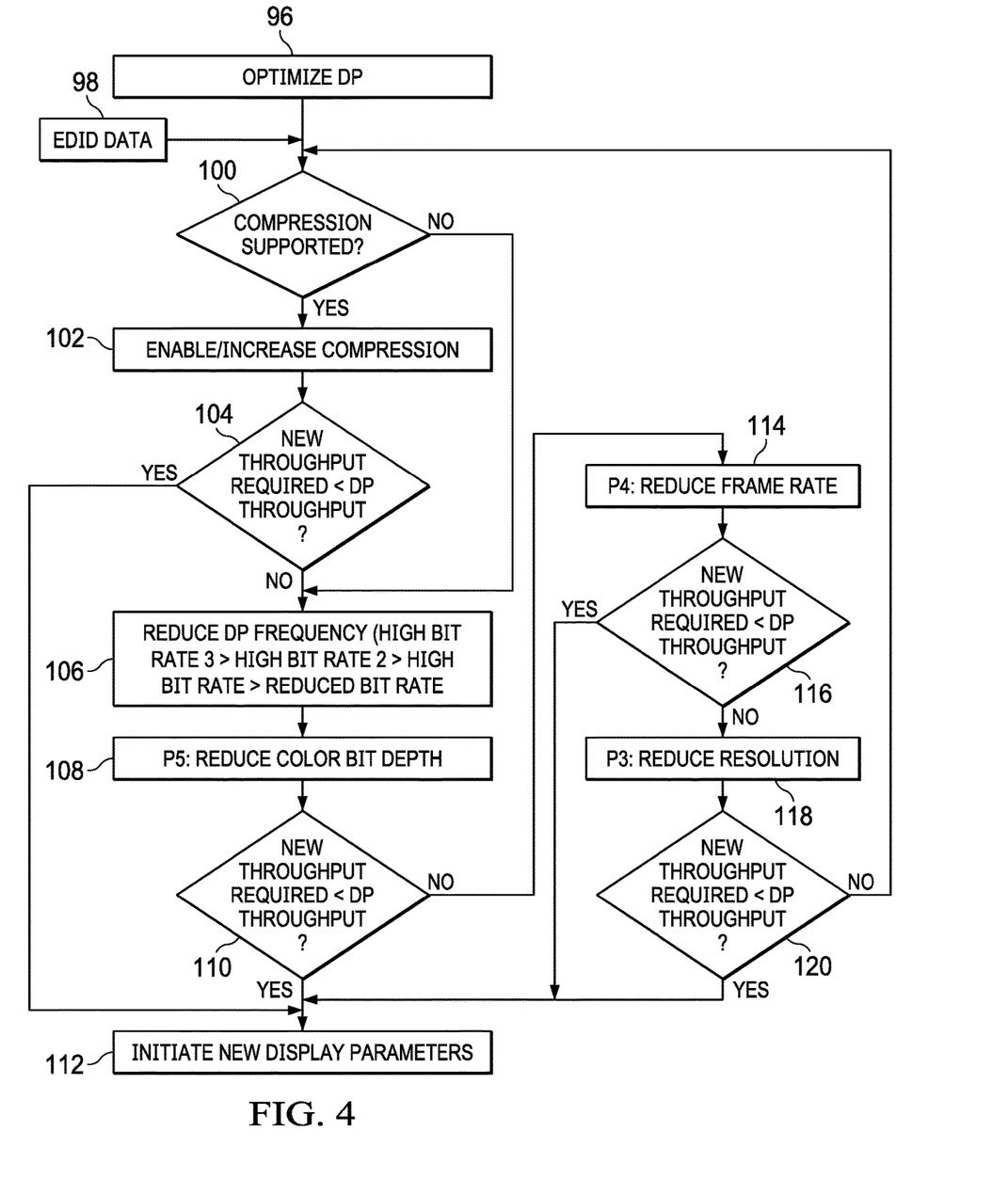
FIG. 4 depicts a flow diagram of a process for adjusting multi-stream communication where a graphics protocol has priority.

Referring now to FIG. 4, a flow diagram depicts a process for adjusting multi-stream communication where a graphics protocol has priority. The process starts at step 96, applies EDID data for the display at step 98, such as to determine display resolution and framerate, and continues to step 100 to determine if compression of graphics information is supported on the graphics interface. If compression is supported, the process continues to step 102 to enable or increase compression and then step 104 to determine if the throughput improvement provided by compression is sufficient to address the link errors. If the throughput improvement by compression is sufficient, the process continues to step 112 to initiate the new display parameters. If at step 100 compression is not supported or at step 104 the improved throughput is not sufficient, the process continues to step 106 to reduce the DisplayPort frequency from its active setting, such as a high bit rate 3 (8.1 Gbit/s), high bit rate 2 (5.4 Gbits/s), high bit rate (2.7 Gbits/s) or reduced bit rate (1.62 Gbits/s). At step 108 the color bit depth is reduced to fit within the bandwidth available at the selected transfer rate. At step 110 a determination is made of whether the adjusted parameters are sufficient for the desired graphics throughput. If the protocol adjustments are sufficient, the process initiates the protocol adjustments at step 112. If the adjustments are not sufficient, the process continues to step 114 to reduce the framerate of the graphics information. At step 116 a determination is made of whether the reduced frame rate is sufficient and, if so, the process ends at step 112. If the reduced framerate is not sufficient, the process continues to step 118 to reduce the displayed resolution. At each of steps 102, 106, 108, 114 and 118, the amount of graphics information required is compared with the amount needed to determine if additional bandwidth is required, and if so the graphics protocol is further adjusted. If at step 120 the amount of graphics bandwidth remains insufficient, the process returns to step 100 to reiterate protocol adjustments that will achieve the desired minimum bandwidth.

Referring now to FIG. 5, a flow diagram depicts a process for adjusting multi-stream communication where a USB data protocol has priority. The process starts at step 122 and at step 124 determines if the USB throughput is fully utilized. If so, the process continues to step 126 to optimize graphics information transfer as depicted in FIG. 4 with the reduced graphics transfer providing improved link robustness. If the USB data is not fully utilized, the process continues to step 128 to reduce the USB data protocol frequency, thus slowing USB data transfer to a rate that more closely matches the needed bandwidth. At step 130, a determination is made of whether sufficient USB bandwidth is available and, if an excess of bandwidth is available the process returns to step 124 to repeat the optimization process. If at step 130 the amount of bandwidth meets the information transfer needs, the process ends at step 132 by increasing the number of lanes available for DisplayPort graphics communication.

Referring now to FIG. 6, a flow diagram depicts a process for adjusting multi-stream communications and power delivery to achieve information transfer constraints. The process starts at step 134 and continues to step 136 to determine if a lowest level of USB PD power level setting is greater than the total system power (TSP) use, meaning the power to run the system and charge the battery. If so, then sufficient power is available at the lowest power transfer protocol configuration and the process continues to step 138 to set the lower USB PD voltage. If the total system power exceeds the lowest power transfer setting, the process continues to step 142 to determine if the lowest USB PD power level exceeds the system power level, meaning the amount of power for running the system without charging the battery. If not, the process returns to step 134. If the power is sufficient to run the system without charging the battery, the process continues to step 144 to determine if the battery charge is above a threshold that will allow the lower power setting to be used and thus decrease battery charging. If so, the process continues to step 146 to set the power protocol configuration. At step 140, link errors are monitored to determine if an improvement was provided by the adjusted power configuration. If no improvement is provided, the process returns to step 136 to determine if a lower power setting may be used. If the link reliability improves with the adjusted power configuration, the process returns to the idle state at step 134.

Although the present invention has been described in detail, it should be understood that various changes, substitutions and alterations can be made hereto without departing from the spirit and scope of the invention as defined by the appended claims.

What is claimed is:

1. An information handling system comprising:
    a processor operable to execute instructions that process information;
    a memory interfaced with the processor and operable to store the instructions and information;
    a graphics processor interfaced with the processor and operable to process information to create pixel values that define a visual image at a display;
    a power manager operable to accept power from an external power source and apply the power to operate the processor, memory and graphics processor and to charge a battery;
    a communication port configured to couple to a communication cable having plural data lanes and a power lane;
    a communications manager interfaced with the processor, graphics processor, power manager and the communication port, the communications manager operable to configure a first set of the plural data lanes to communicate with the graphics processor through a graphics protocol, a second set of the plural data lanes to communicate with the processor through a data protocol and the power lane to communicate power to the power manager through a power protocol, the communications manager further operable to determine errors in communication of information by the graphics protocol and the data protocol; and
    wherein the communications manager tracks the errors to detect an error threshold and, in response to the error threshold, adjusts communication by changing one or more parameters of at least one of the graphics, data and power protocols.

2. The information handling system of claim 1 wherein the errors comprise bit error correction applied to data packets sent by the data protocol to self-correct the data packets.

3. The information handling system of claim 1 wherein the errors comprise forward error correction applied to graphics information communicated by the graphics protocol to self-correct the graphics information.

4. The information handling system of claim 1 wherein the errors comprise retransmission of information by either of the graphics or data protocols.

5. The information handling system of claim 1 wherein the communications manager adjusts communication by changing the graphics protocol to reduce from four data lanes to two data lanes, changing the data protocol to include the two data lanes reduced by the graphics protocol, and reducing the data rate for transfer of the information by the data protocol.

6. The information handling system of claim 1 wherein the communication manager adjusts communications by changing that amount of power transferred by the data protocol.

7. The information handling system of claim 6 wherein the amount of power transferred is selected to have a noise profile with a predetermined resonance relationship to a data rate of the data protocol.

8. The information handling system of claim 1 wherein the communications manager adjusts communication by turning off power transfer for a predetermined amount of time.

9. The information handling system of claim 1 wherein the communications manager adjusts communication by changing the data protocol to reduce by two data lanes, changing the graphics protocol to include the two data lanes reduced by the data protocol, and reducing the data rate for transfer of the information by the graphics protocol.

* * * * *